United States Patent [19]
Goto

[11] Patent Number: 5,587,765
[45] Date of Patent: Dec. 24, 1996

[54] CAMERA CAPABLE OF PERFORMING DIVISIONAL PHOTOMETRY

[75] Inventor: Tetsuro Goto, Funabashi, Japan

[73] Assignee: Nikon Corporation, Tokyo, Japan

[21] Appl. No.: 450,223

[22] Filed: May 25, 1995

Related U.S. Application Data

[63] Continuation of Ser. No. 145,503, Nov. 4, 1993, abandoned.

[30] Foreign Application Priority Data

Nov. 5, 1992 [JP] Japan ................................. 4-296028

[51] Int. Cl.$^6$ ........................................... G03B 7/08
[52] U.S. Cl. ............................. 396/234; 396/274
[58] Field of Search ........................... 354/432, 481, 354/476, 477

[56] References Cited

U.S. PATENT DOCUMENTS

| | | | |
|---|---|---|---|
| 4,364,650 | 12/1982 | Terashita | 354/432 |
| 4,394,078 | 7/1983 | Terashita | 354/432 |
| 4,420,252 | 12/1983 | Nakauchi | 354/432 |
| 4,445,778 | 5/1984 | Nakauchi | 354/432 |
| 4,855,780 | 8/1989 | Hayakawa | 354/432 |
| 4,929,824 | 5/1990 | Miyazaki | 354/432 |

FOREIGN PATENT DOCUMENTS

| | | |
|---|---|---|
| 4-215631 | 8/1992 | Japan . |
| 4-251230 | 9/1992 | Japan . |

*Primary Examiner*—Russell E. Adams
*Attorney, Agent, or Firm*—Oliff & Berridge

[57] ABSTRACT

The camera capable of performing divisional photometry according to the present invention includes a photometric sensor which is made up from a plurality of photoelectric conversion sub-elements arranged in close proximity to one another over a predetermined light receiving region in a two dimensional array and which performs divisionally photometry on the photographic field divided into a plurality of regions, an image projection optical system which projects an image of a photographic field upon light receiving surfaces of a proper subset of this plurality of photoelectric conversion sub-elements which occupies a region which is smaller than the predetermined light receiving region, and a calculation device which calculates an exposure value based upon the photometric outputs from the proper subset of the plurality of photoelectric conversion sub-elements.

19 Claims, 10 Drawing Sheets

CAMERA CAPABLE OF PERFORMING DIVISIONAL PHOTOMETRY

This is a continuation of application Ser. No. 08/145,503 filed Nov. 4, 1993, now abandoned.

BACKGROUND OF THE INVENTION

1. Field of the Invention

The present invention relates to a camera which is capable of performing photometry on the photographic field by dividing it up into a plurality of regions and of calculating an exposure value based upon the photometric outputs from these regions.

2. Related Background Art

Recently more and more cameras have been produced which perform a so called divisional photometry method. With this divisional photometry method, photometry is performed by dividing the photographic field into a plurality of regions, and a photometric signal is obtained for each of these regions; and, for this method, the photometric element (typically a photoelectric conversion element) is divided into a plurality of sub-elements which correspond to the above described plurality of regions on the photographic field. Further, an exposure value is calculated based upon the output photometric signals for the various regions, so that photography of the principal object to be photographed can be performed with appropriate exposure settings, without the illumination level of the background exerting any effect.

With this type of divisional photometry method, the greater is the number of sub-elements into which the photometric element is subdivided, the greater is the resolution which can be obtained for the distribution of illumination over the principal object to be photographed and the area surrounding it, and accordingly the more appropriate is the exposure value which can be calculated; and therefore in recent years this number of sub-elements has increased steadily up to the range of several tens, and in the near future it is expected that in some devices the number of sub-elements will be in the range of several hundreds. For examples, reference should be made to Japanese Patent laid-open Applications Nos. 4-215631 and 4-251230.

Figure 11:
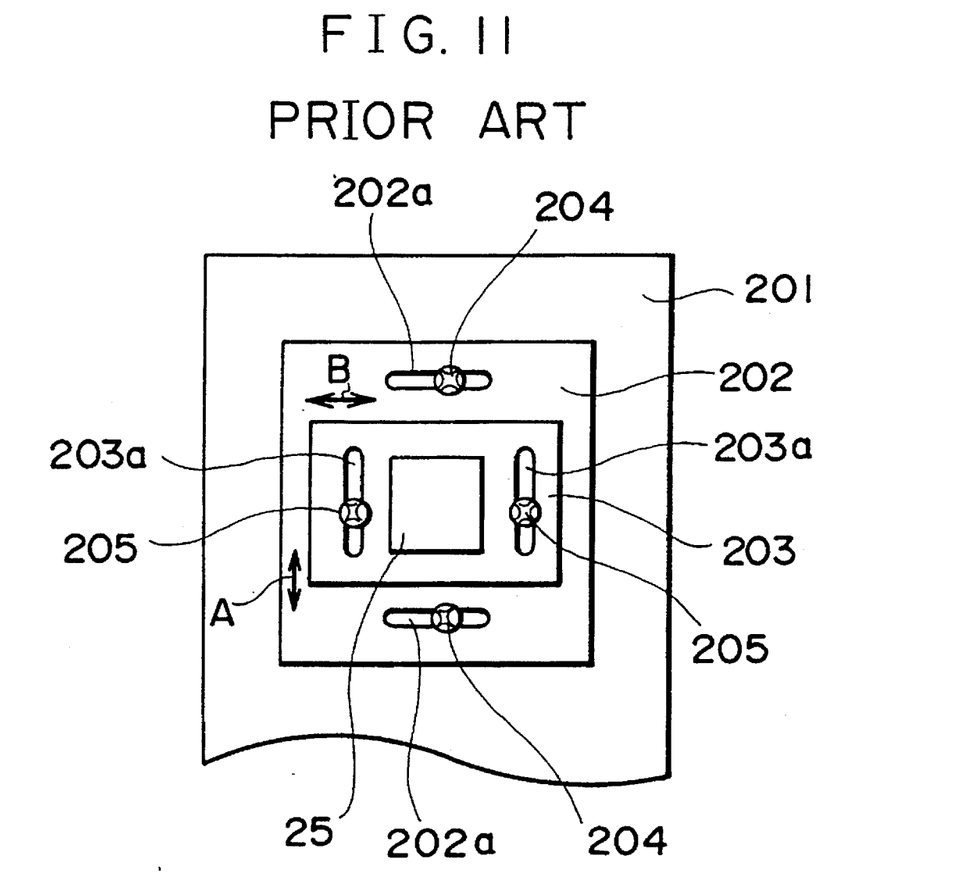
FIG. 11 is a figure showing an example of a prior art construction for fixing a photometric sensor to the body of a camera in such a manner that its position can be adjusted.

However, with such a divided method of photometry as described above, if the position within the camera of the photometric sensor on which the light coming from the photographic field should fall has not been set accurately, then a proportion of the light emanating from the photographic field does not reach this photometric sensor, and deviation occurs between the divided photometric regions on the photographic field and the divided sub-elements of the photometric sensor which correspond to these photometric regions, so that an accurate photometric result for the object to be photographed cannot be obtained. In this connection, in the prior art, as shown in FIG. 11 of the drawings, the photometric sensor (denoted as 25) has been fixed to the body of the camera by a position adjusting construction which can provide fine adjustment both in the up and down directions and in the left and right directions. Thereby, the position of the photometric sensor 25 can be finely adjusted both upwards and downwards and also leftwards and rightwards, and can be set to correspond accurately to the position of the light emanating from the photographic field.

In more detail, referring to FIG. 11, in this prior art the photometric sensor 25 is fixed to a first support plate 203, and this first support plate 203 is fixed to a second support plate 202, which itself is fixed to a support base 201. These constructions are built so as to be adjustable, in the following manner. Two slots 203a are formed through the first support plate 203 and extend in the direction denoted as "A" in the figure (which corresponds to the up and down direction when the camera is being used for photography), and two bolts 205 are passed through these slots 203a and are threaded into bolt holes (not particularly shown in the figure) formed in the second support plate 202. Thereby, when these two bolts 205 are tightened up, the first support plate 203 and the photometric sensor 25 cannot move with respect to the second support plate 202 in any direction; but, when the two bolts 205 are loosened somewhat, first support plate 203 and the photometric sensor 25 can be slid with respect to the second support plate 202 in the direction "A", but cannot be moved in the direction "B" perpendicular thereto. Similarly, two slots 202a are formed through the second support plate 202 and extend in the direction denoted as "B" in the figure (which corresponds to the left and right direction when the camera is being used for photography), and two bolts 204 are passed through these slots 202a and are threaded into bolt holes (not particularly shown in the figure) formed in the support base 201. Thereby, when these two bolts 204 are tightened up, both of the support plate 202 and 203 and the photometric sensor 25 affixed thereto cannot move with respect to the second support plate 202 in any direction; but, when the two bolts 204 are loosened somewhat, both of the first support plate 202 and 203 and the photometric sensor 25 affixed thereto can be slid with respect to the support base 201 in the direction "B", but cannot be moved in the direction "A".

However, the larger is the number of sub-elements into which the photometric sensor 25 is divided, the more strictly must the above described position adjustment process for the photometric sensor 25 be performed; and the problem arises that this position adjustment process takes a long time and is troublesome. Further, when the photometric sensor is fixed to the body of the camera via this type of position adjusting construction, it is not possible to be absolutely confident that the photometric sensor is solidly fixed in place, and there is a danger that its position may gradually change due to the effects of shock and vibration upon the camera or over the passage of time, in which case it may become impossible to perform accurate photometry.

SUMMARY OF THE INVENTION

The objective of the present invention is to provide a camera with which the position of the photometric sensor can be set comparatively roughly, and which further can perform divisionally photometry without any problem arising of deviation in the position of the photometric sensor due to vibration or the like.

In order to attain this objective, the present invention provides a camera capable of performing divisional photometry, comprising: a photometric sensor having a plurality of photoelectric conversion sub-elements arranged in close proximity to one another over a predetermined light receiving region in a two dimensional array, and which performs divisionally photometry on the photographic field divided into a plurality of regions; an image projection optical system which projects an image of a photographic field upon light receiving surfaces of a proper subset of said plurality of photoelectric conversion sub-elements which occupies a region which is smaller than said light receiving region; and a calculation means which calculates an exposure value based upon the photometric outputs from said proper subset of said plurality of photoelectric conversion sub-elements.

According to the present invention as specified above, the image of the photographic field is projected upon the light receiving surfaces of a proper subset of the plurality of photoelectric conversion sub-elements which occupies a region which is smaller than the total light receiving region of the photometric sensor. The calculation means calculates an exposure value based upon the photometric outputs from this proper subset of the plurality of photoelectric conversion sub-elements upon which the image of the photographic field is thus projected. Since any proper subset of the photoelectric conversion sub-elements upon which the image of the photographic field happens to be thus projected will do as well as any other, it is only necessary to fix the photometric sensor in place in a position such that the image of the photographic field definitely does not wander over its edge, and accordingly the fixing in place of the photometric sensor can be performed relatively roughly as compared with the prior art, so that the time required for such fixing is reduced. Further, since no adjustable construction is required for fixing the photometric sensor in place, it is possible to reduce the bulk of the camera, and also the photometric sensor can be fixed in place more solidly than was practicable with the prior art, so that there is no danger of the photometric sensor becoming displaced due to vibration or over the passage of time.

Further, according to a specialization of the present invention, an accumulation type of image sensor which comprises M×N photoelectric conversion sub-elements which are arranged in a rectangular array measuring M vertically by N horizontally to constitute the above-mentioned light receiving region, and which performs photometry by dividing the photographic field into a plurality of regions, may be employed as the above-mentioned image sensor. By arranging the photometric sub-elements in a rectangular array in this manner, it is possible to perform photometry by dividing the entire photographic field up regularly into a plurality of regions, and accurate photometry can be performed.

Further, according to another aspect of the present invention, there is provided a camera capable of performing divisional photometry, comprising a photometric sensor of the above described type, an image projection optical system also of the above described type, a mode setting means which sets either of a photographic mode and a field determination mode according to the actuation of an operating member, a determination means which, when the field determination mode is set, based upon the photometric outputs from the plurality of photoelectric conversion sub-elements, determines for each of the plurality of photoelectric conversion sub-elements whether it is a valid sub-element which is included in the proper subset of the plurality of photoelectric conversion sub-elements upon which the image of the photographic field falls, or an invalid sub-element which is not included in the proper subset of the plurality of photoelectric conversion sub-elements upon which the image of the photographic field falls, a storage means which stores the results of the determinations performed by the determination means, a selection means which based upon the information stored by the storage means selects the valid sub-elements from the plurality of photoelectric conversion sub-elements, and a calculation means which calculates an exposure value based upon the photometric outputs from the valid photoelectric conversion sub-elements selected by the selection means.

According to the present invention as specified above, when the field determination mode is set, for each of the plurality of photoelectric conversion sub-elements, it is determined, based upon the photometric outputs from the plurality of photoelectric conversion sub-elements included in the photometric sensor, whether it is a valid sub-element which is included in the proper subset of the plurality of photoelectric conversion sub-elements upon which the image of the photographic field falls, or an invalid sub-element which is not included in the proper subset of the plurality of photoelectric conversion sub-elements upon which the image of the photographic field falls. And the results of these determinations are stored. Further, when the photographic mode is set, based upon the stored information, the valid sub-elements are selected from the totality of the photoelectric conversion sub-elements, and an exposure value is calculated based upon the photometric outputs from the valid photoelectric conversion sub-elements thus selected, but not based upon the photometric outputs from the others of the photoelectric conversion sub-elements which are the invalid ones. Accordingly, it is possible accurately to select those ones of the photometric sub-elements upon which the image of the photographic field falls, and an accurate exposure value can be calculated based only upon the output signals from these valid photometric sub-elements.

DESCRIPTION OF THE PREFERRED EMBODIMENTS

A preferred embodiment of the present invention as applied to a single lens reflex camera will now be explained with reference to FIGS. 1 through 8 of the appended drawings.

Figure 1:
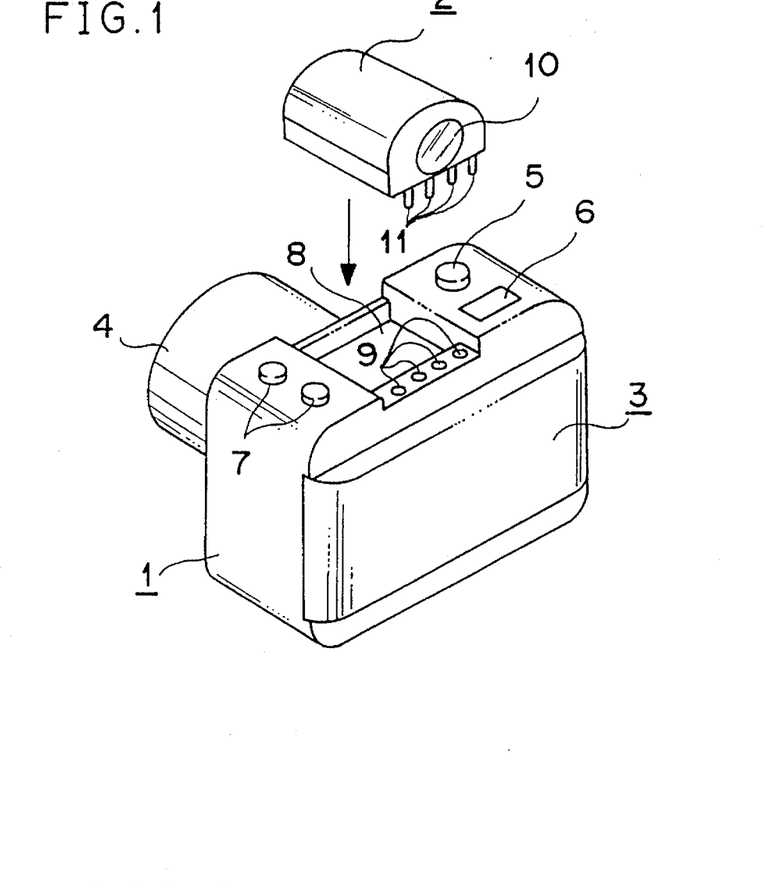
FIG. 1 is a perspective view as seen from the rear showing a single lens reflex camera according to the preferred embodiment of the present invention.

FIG. 1 is an external perspective view as seen from the upper left rear showing the outside of a single lens reflex camera according to this first preferred embodiment of the present invention. The reference numeral 1 denotes the main body of the camera, and 2 denotes a detachable viewfinder which can be attached to and separated from a screen portion 8 on the upper surface of the camera body 1, while 3 denotes a film lid covering the rear surface of the camera body 1 which can be opened and closed for loading and removing film and 4 denotes a detachable photographic lens which can be attached to and separated from the front surface of the camera body 1. On the upper surface of the camera body 1 there are provided a release button 5, a liquid crystal display 6, and two setting buttons 7. The two setting buttons 7 are for setting the selection of photometric mode or exposure mode or film forwarding mode or the like.

Figure 2:
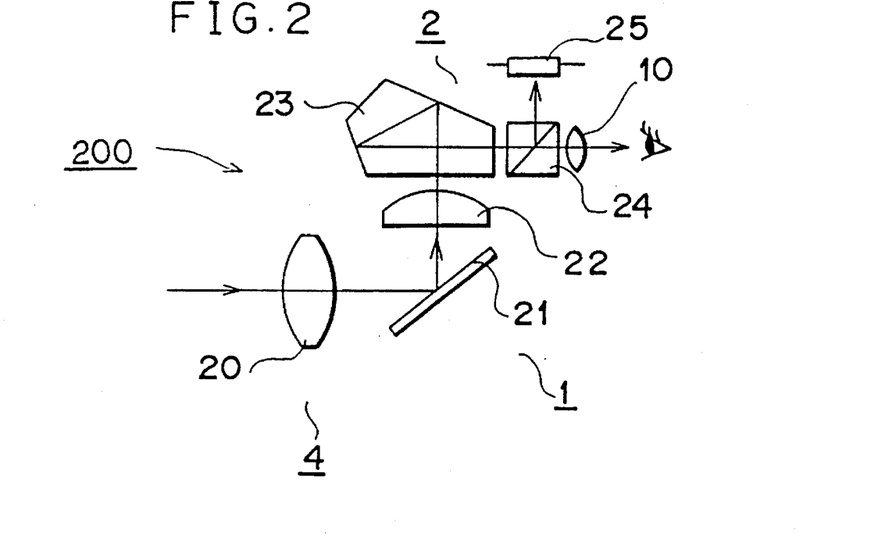
FIG. 2 is a figure showing in schematic cross section the optical system of this preferred embodiment camera.
Figure 5:
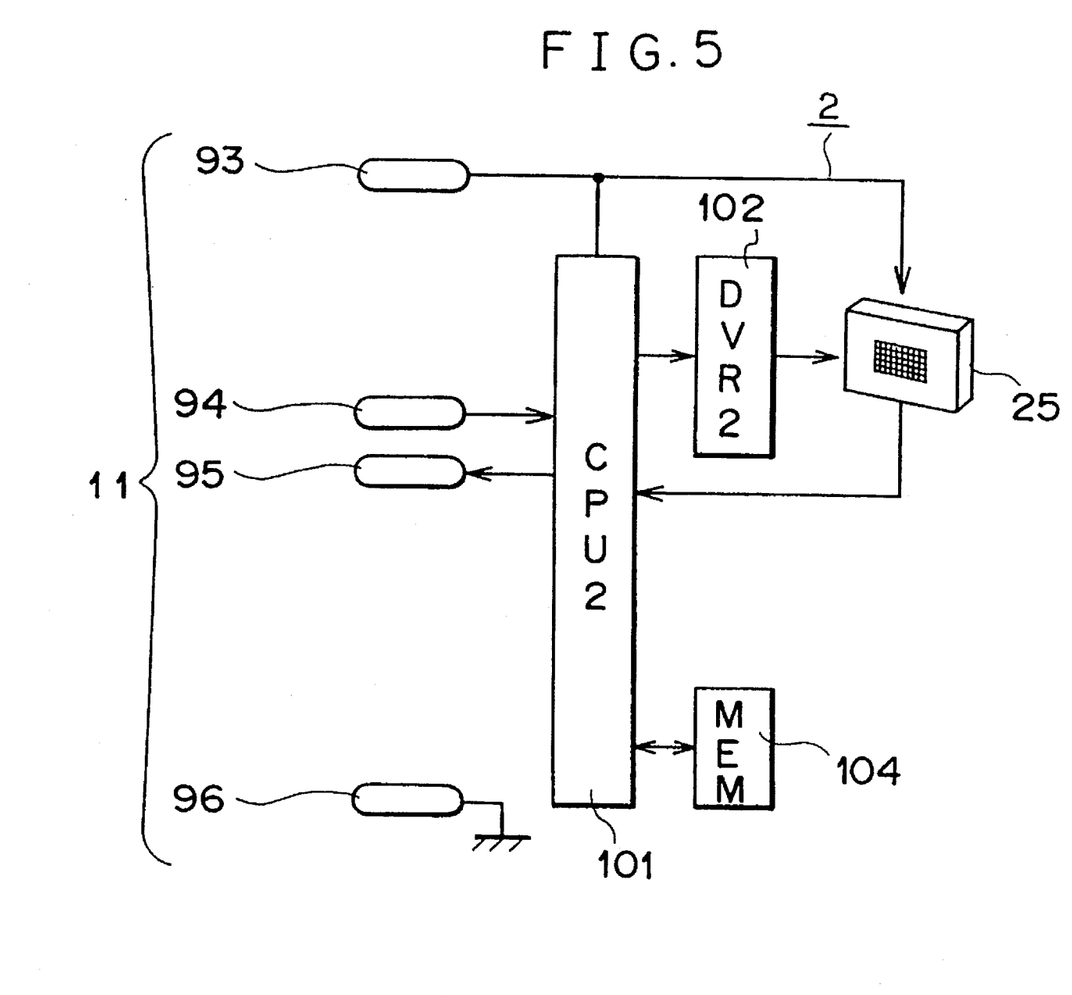
FIG. 5 is a block diagram showing a control system provided within the viewfinder of this camera.

The viewfinder 2 comprises an eyepiece section 10 to view the photographic field therein, a photometric sensor 25 which is shown in FIG. 2, and an electrical circuit of which is shown in FIG. 5. When this viewfinder 2 is fitted to the screen portion 8 on the upper surface of the camera body 1, the contacts of a contact group 11 comprised in the electrical circuit of FIG. 5 are individually and respectively brought into contact with the contacts of a contact group 9 fitted in the camera body 1, and thereby the circuitry in the viewfinder 2 is brought into electrical communication with the circuitry in the camera body 1.

FIG. 2 is a figure showing in schematic cross section the optical system (denoted collectively as 200) of this camera, and particularly showing a light beam from the object to be photographed which passes through the photographic lens 4, the camera body 1, and the viewfinder 2 to reach the eye of the camera user. The reference numeral 20 denotes an optical system which is provided within the photographic lens 4, and the light rays from the object to be photographed which have passed through this optical system 20 are reflected in the upward direction from a main mirror in the camera body 1, and these reflected light beams are focused upon a screen 22 incorporated in the screen portion 8. After this focused light from the object to be photographed has been transmitted to a half silvered mirror 24 via a pentaprism 23, a portion thereof passes through the half silvered mirror 24 and through the eyepiece section 10 to reach the eye of the camera user, while another portion thereof is reflected in the upward direction to reach a photometric sensor 25.

Figure 3:
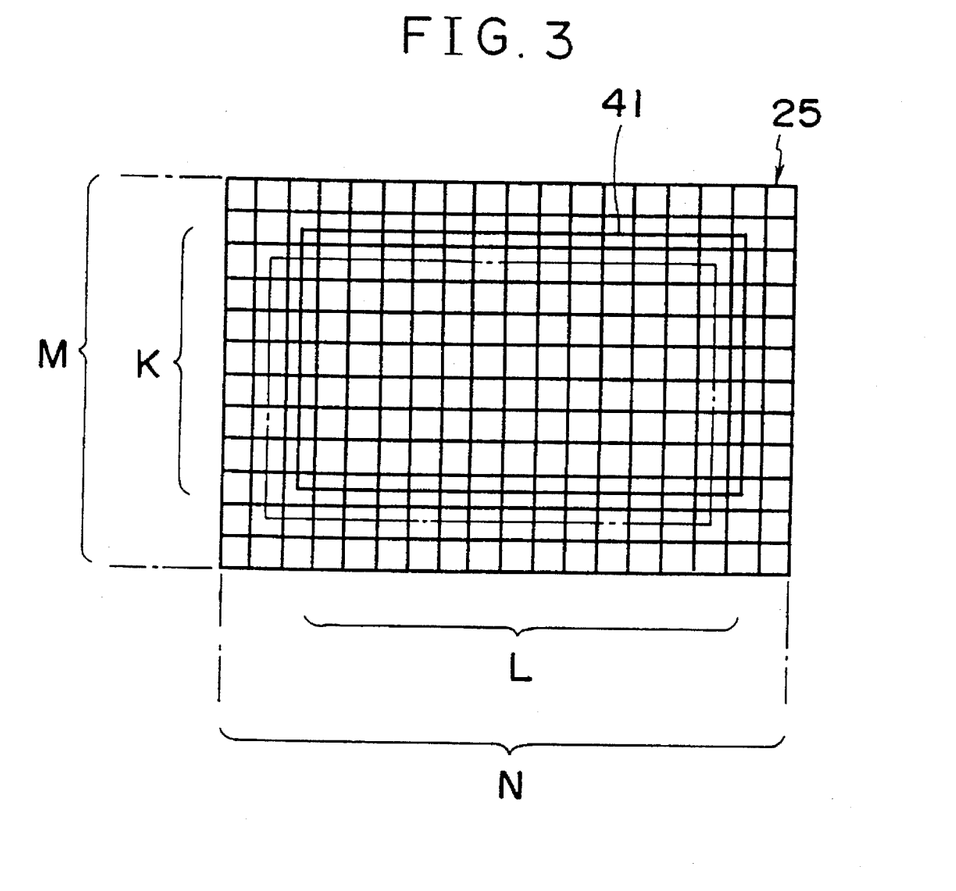
FIG. 3 is a figure showing how a photometric sensor of this preferred embodiment camera is divided into a rectangular matrix of sub-elements.

The photometric sensor 25 of this preferred embodiment of the present invention is for example an image sensor made up of a CCD (charge coupled device), and as shown in FIG. 3 comprises, within a fixed light sensitive area, a total of M×N sub-elements (photoelectric conversion devices) arranged in the form of a matrix which has M rows and N columns, i.e. which measures M sub-elements in the vertical direction by N sub-elements in the horizontal direction. Further, the photometric sensor 25 comprises a charge accumulation section, a transmission section, and a voltage conversion section, none of which are shown in the figures. Each of the sub-elements receives light rays directed upon it as described above and originating from a portion of the photographic field which particularly corresponds to the sub-element and performs photoelectric conversion, and the charge accumulation section accumulates the electric charge which is generated by this photoelectric conversion process. These accumulated electric charges are read out by the transmission section in time series according to the receipt of a predetermined clock signal, and, after the voltages thereof have been converted by the voltage conversion section, these signals are input to a CPU 101 which is shown in FIG. 5 to be described hereinafter as digital photometric signals each of which is a function of the intensity of the illumination of its corresponding portion of the photographic field. In other words, in this preferred embodiment, the photometric sensor 25 divides the entire photographic field up into M×N regions and performs divided photometry for these M×N regions individually.

However, in this preferred embodiment, the area of the photometric sensor 25 which actually corresponds to the photographic field, i.e. upon which light rays emanating from an object to be photographed can actually fall, is smaller than the total area of the photometric sensor 25 which is capable of reacting to light, i.e. than the total area of the M×N sub-elements of the photometric sensor 25, and may for example be like the rectangular area shown in FIG. 3 as 41. That is to say, the optical system of FIG. 2 is constructed in advance so that light from the object to be photographed can fall upon the light receiving surface of the photometric sensor 25 which is composed of the above described plurality of sub-elements only over a region narrower than the total light receiving area thereof. In the shown example, in concrete terms, light from the object to be photographed can only fall upon a central rectangle 41 composed of K×L sub-elements included within the total area of the M×N sub-elements of the photometric sensor 25, and for this reason, even though the photometric sensor 25 is subdivided into a total of M×N sub-elements, in practice the entire photographic field is subdivided for photometric purposes into only a lesser number K×L of regions which correspond to this central rectangle 41 composed of K×L sub-elements of the photometric sensor 25.

However, the above described region upon which light from the object to be photographed is not limited to being the region 41 described above. For example, the region upon which light from the object to be photographed can fall may be the rectangle outlined in FIG. 3 by the single dotted line. Accordingly, with the preferred embodiment of the present invention, its position on the photometric sensor 25 is only considered as being determined comparatively roughly.

As an example, supposing that the size of a single one of the CCD sub-elements is 20 μm by 20 μm which is typical, and supposing that the matrix on the photometric sensor 25 is 200 sub-elements vertically by 300 sub-elements horizontally, then the total size of the CCD will be 4 mm vertically by 6 mm horizontally. Further, supposing that on the other hand the region of the photometric sensor 25 upon which light from the object to be photographed can fall is a rectangle which is 3 mm vertically by 5 mm horizontally, then the position setting of this region on the photometric sensor 25 can be performed within a margin of 0.5 mm either way, both in the vertical direction and in the horizontal direction. Wherever this region is positioned upon the total light sensitive surface of the photometric sensor 25, it will cover a rectangle of sub-elements thereof which measures 150 elements vertically by 250 elements horizontally.

When in this manner it is possible to determine the position of the photometric sensor 25 roughly, it becomes possible to fix the photometric sensor 25 solidly into place. That is to say, whereas in the prior art as described above the photometric sensor was required to be fixed to the body of the camera via a position adjustment construction which allowed the position of the photometric sensor to be adjusted relative to the camera body both in the vertical direction and in the horizontal direction since it was necessary to be able to position the photometric sensor very accurately, by contrast, with this preferred embodiment of the present invention, the photometric sensor 25 can be fixed to the body of the camera without providing any position adjustment construction between them, because it is not necessary to perform fine adjustment of the position of the photometric sensor 25. For example, it will be quite satisfactory to provide a concave shaped depression in the camera body into which the photometric sensor 25 can be fitted, and to insert the photometric sensor 25 into this concave shaped depression and to fix it securely therein. According to such a method for fixing the photometric sensor 25 to the camera body 1, there is no danger of it becoming impossible to perform accurate photometry due to shifting of the position of the photometric sensor 25 by the shock and vibration upon the camera or even gradually over the passage of time.

Next, electrical circuitry incorporated in the camera body 1 and in the viewfinder 2 will be explained.

Figure 4:
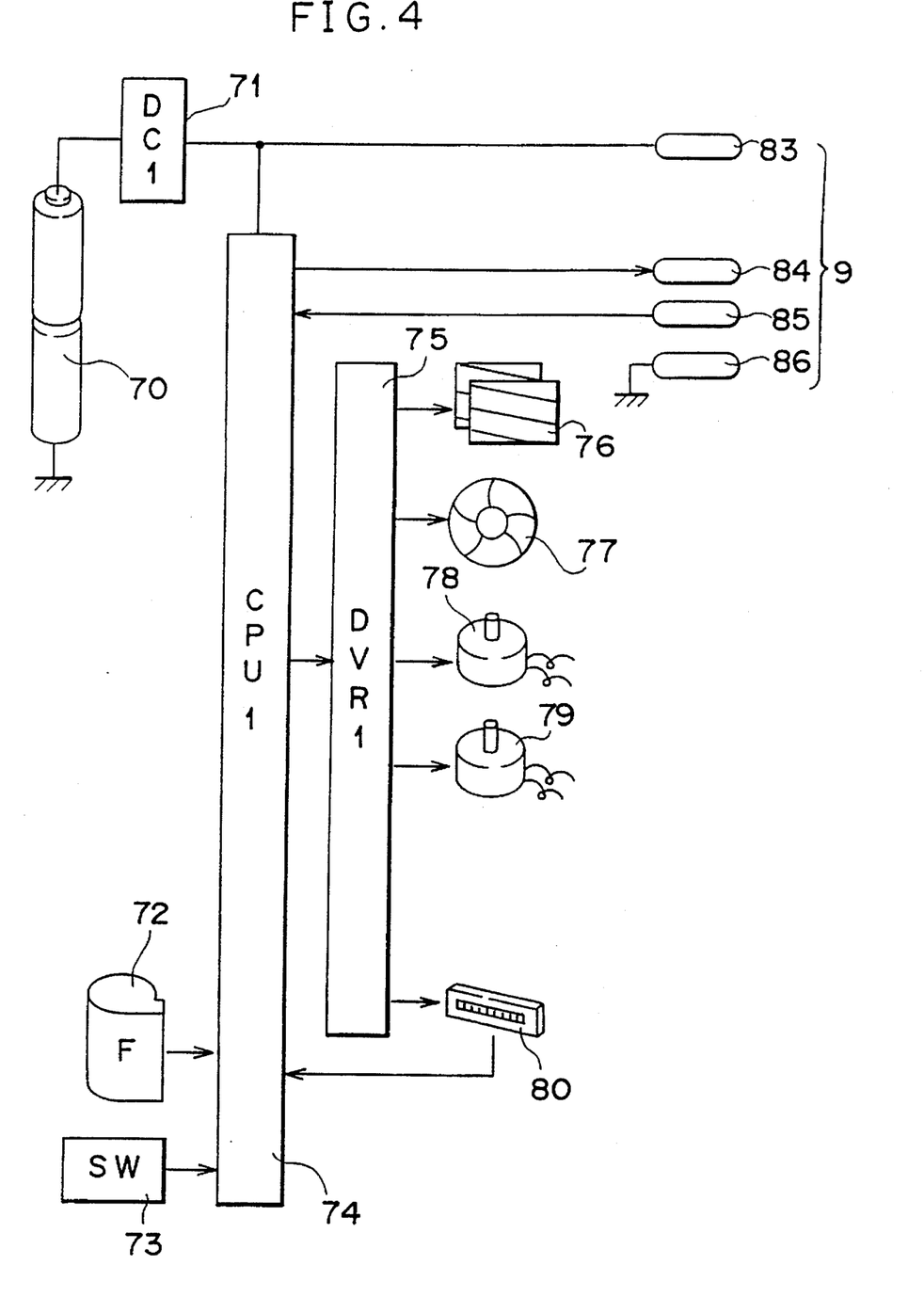
FIG. 4 is a block diagram showing a control system provided within the body of this camera.

FIG. 4 is a block diagram showing circuitry within the camera body 1. Actuating electrical energy is supplied from a battery 70 via a DC/DC converter 71 to all of this FIG. 4 circuitry, and is also supplied to the circuitry in the viewfinder 2 (see FIG. 5), when the viewfinder 2 is fitted to the camera body 1, via a contact 83 included in the contact group 9 described above and via a corresponding and contacting contact 93 of the contact group 11. In detail, the contact group 9 provided on the screen portion 8 of the camera body 1 (see FIG. 1) is made up of four contacts 83 through 86, and when the viewfinder 2 is fitted to the camera body 1 these contacts 83 through 86 come into respective contact with four contacts 93 through 96 of which the contact group 11 provided on the viewfinder 2 is composed.

The reference numeral 74 denotes a central processing control circuit (hereinafter referred to simply as a CPU) which comprises a CPU, ROM, RAM, etc. and which performs overall sequencing of this camera. To this CPU 74 there are input the values of parameters related to exposure as calculated by the circuitry in the viewfinder 2 via the above described contact 85, while on the other hand the CPU 74 outputs the film ISO sensitivity and a position adjustment mode signal to the circuitry in the viewfinder 2 via the contact 84. Further, to the CPU 74 there is also connected certain circuitry described hereinafter.

The reference numeral 72 denotes a film sensitivity detection circuit, which detects the ISO sensitivity of the film (not shown) loaded into this camera and inputs a signal representative thereof to the CPU 74. And 73 denotes a switch group which comprises a plurality of switches and which inputs to the CPU 74 a signal representative of the ON/OFF states of these switches. These switches in the switch group 73 are not shown in detail, but include a first stroke switch which is turned ON when the release button 5 described (see FIG. 1) is partially depressed by the camera user as far as a first stroke position thereof, a second stroke switch which is turned ON when the release button 5 is further fully depressed by the camera user to a second stroke position thereof, setting switches which are turned ON and OFF in accordance with the operation of the above described two setting buttons 7, and the like.

Further, in this preferred embodiment, by the use of a mode switch comprised in this switch group 73, a field determination mode can be selected, in which information of the location of the sub-elements which lies within the above described rectangular region 41 on which the light from the photographic field can fall is determined and is recorded. The operation when the field determination mode is selected will be described hereinafter in detail, but, since this field determination is an operation which is performed by a workman during the manufacture of the camera, the user of the camera never sets this mode. Accordingly, the above described mode switch is provided at a position internal to the camera which cannot be accessed by the user. Moreover, when the field determination mode is not selected, the camera is in a normal photography mode.

Further, the CPU 74 is connected via a drive circuit 75 to a shutter 76, an aperture 77, a film forwarding motor 78, a focusing motor 79, and a focus detection element 80. The CPU 74 drives the focusing motor 79 based upon the output signal from the focus detection element 80 so as to perform focusing action, drives the aperture 77 and the shutter 76 based upon the aperture value and shutter speed as calculated on the side of the viewfinder 2 and performs exposure action, and drives the film forwarding motor 78 so as to perform film winding on action.

FIG. 5 is a block diagram showing circuitry within the viewfinder 2. A CPU 101 drives the photometric sensor 25 via a drive circuit 102, and inputs the photometric signal which the photometric sensor 25 outputs. This photometric signal is temporarily stored in a memory 104, and when required is read out by the CPU 101 and is used for calculating exposure parameters. The calculated exposure parameters are sent to the main body 1 of the camera via the contact 95.

In the following, the operation of this preferred embodiment of the present invention will be explained with reference to the flow charts shown in FIGS. 6 through 8.

Figure 6:
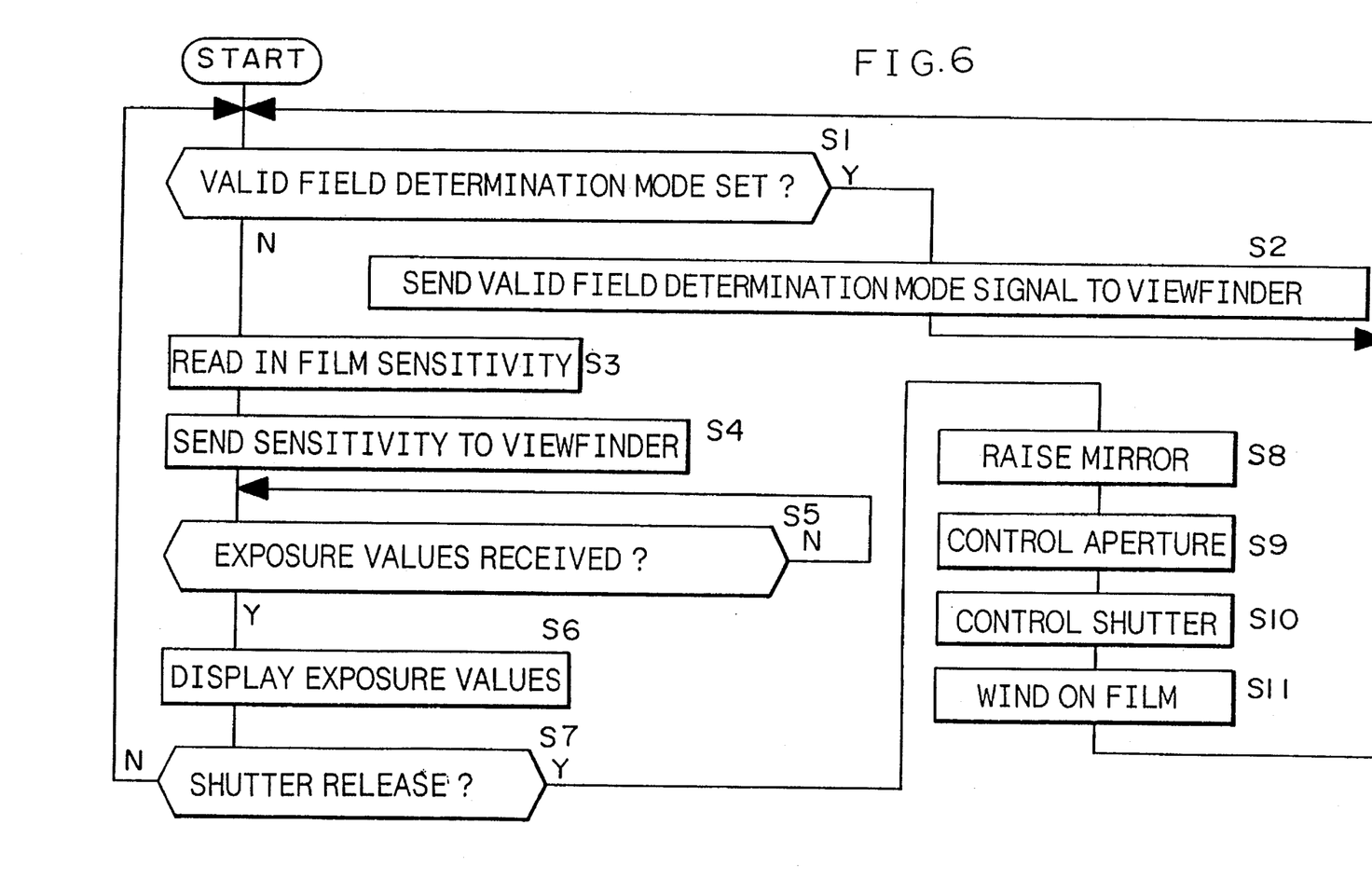
FIG. 6 is a flow chart showing the operation of a control program for a CPU incorporated in the body of this preferred embodiment camera.

FIG. 6 is a flow chart showing the operation of the control program for the CPU 74 incorporated in the camera body 1. The operation of this control program is started, for example, when the above described first stroke switch included in the switch group 73 is turned ON. First, in the step S1, a decision is made as to whether or not the above described field determination mode is set, and if the result is YES then in the step S2 a field determination mode signal is sent via the contact 95 to the CPU 101 on the viewfinder side, and then the flow of control returns to the step S1 in a loop.

If in the step S1 the result of the decision is NO, i.e. when the normal photographic mode is set, then the flow of control proceeds to the step S3, in which the ISO sensitivity value of the film (not shown) loaded into this camera is detected by the film sensitivity detection circuit 72 and is read into the CPU 74, and next in the step S4 the detected film sensitivity value is transferred to the CPU 101 incorporated in the viewfinder via the contact 84. Next, in the looped decision step S5, the flow of control waits until a set of calculated aperture value and shutter speed are received from the viewfinder CPU 101 via the contact 85, and when such aperture value and shutter speed are received the flow of control passes to the step S6. In the step S6, the CPU 74 displays the aperture value and the shutter speed on the liquid crystal display 6. Next, in the decision step S7, a decision is made as to whether or not the above described second stroke switch included in the switch group 73 is turned ON. If the result of this decision is NO then the flow of control returns to the step S1, while if the result of this decision is YES then the flow of control passes to the step S8.

In the step S8, the CPU 74 raises the main mirror 21, and in the next step S9 the CPU 74 controls the aperture 77 via the drive circuit 75 according to the calculated aperture value, and then in the step S10 the CPU 74 controls the shutter 76 so as to open and close it according to the calculated shutter speed. Finally, in the step S11, the CPU 74 controls the film forwarding motor 78 so as to wind on the film, again via the drive circuit 75, and then the flow of control returns to the step S1. And, when the above described first stroke switch included in the switch group 73 is turned OFF, the execution of this program stops.

Figure 7:
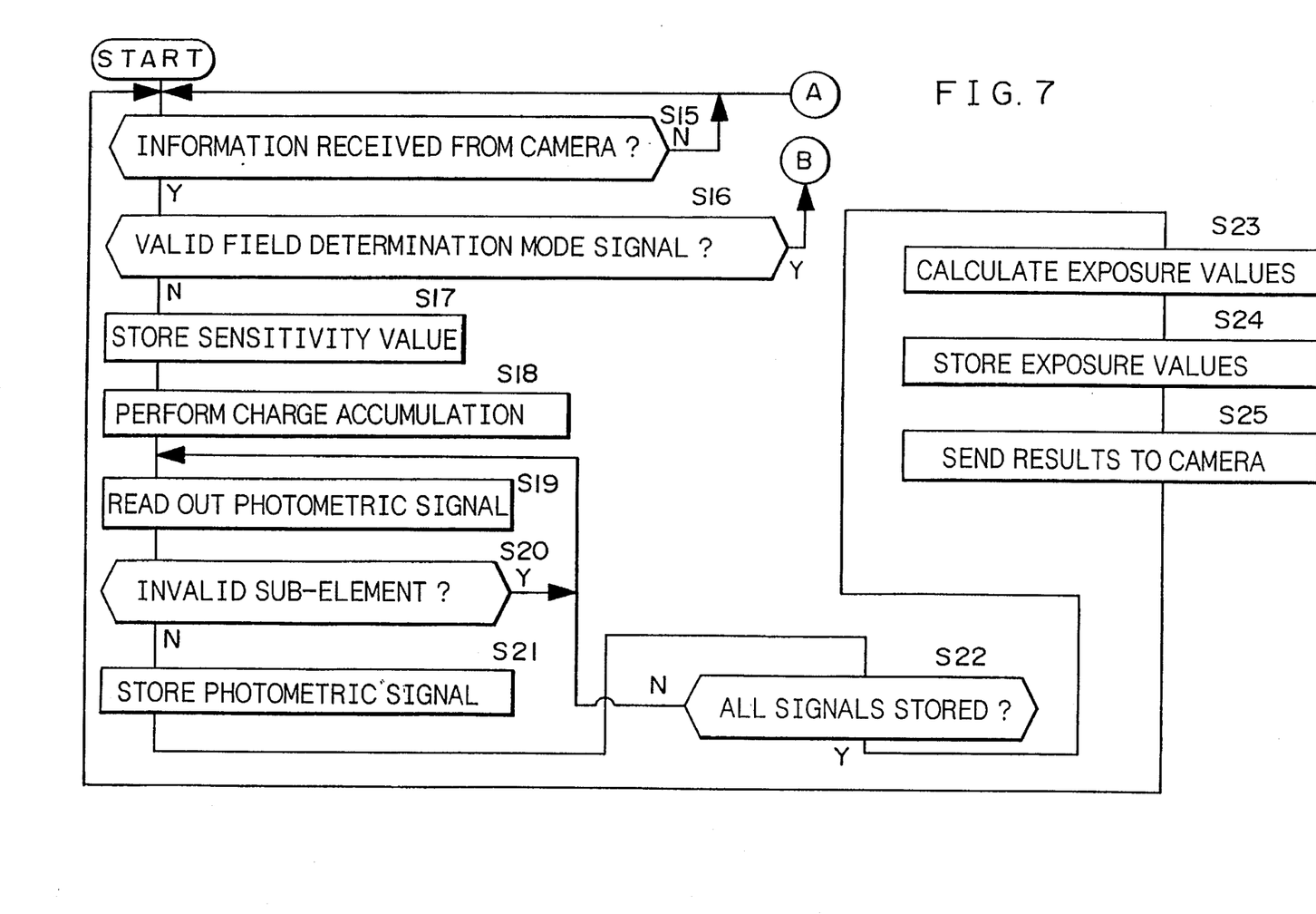
FIG. 7 is a flow chart showing the operation of a control program for a CPU incorporated in the viewfinder of this preferred embodiment camera.
Figure 8:
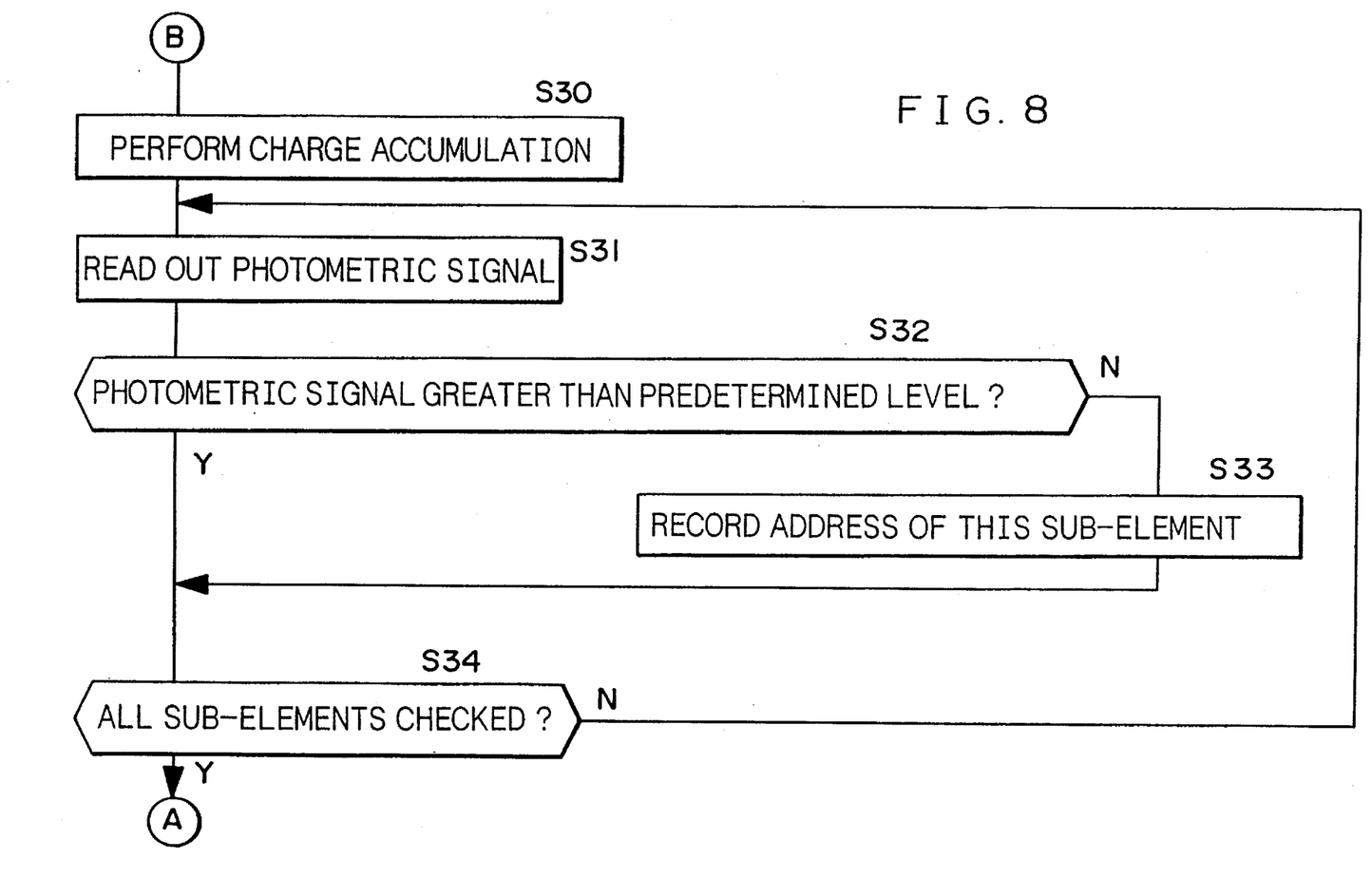
FIG. 8 is a continuation of the FIG. 7 flow chart for the viewfinder CPU.

FIGS. 7 and 8 together constitute a flow chart showing the operation of the control program for the CPU 101 incorporated in the viewfinder 2. This program is always continually executed in an endless loop as long as power continues to be supplied from the camera body 1 to the viewfinder 2.

First, in the looped decision step S15, the flow of control waits until some information is received via the contact 84 from the CPU 74 incorporated within the camera body 1 (such information will either be the ISO sensitivity value of the film loaded into the camera or the field determination mode signal) and when such information has been received the flow of control passes to the step S16. In the step S16, a decision is made as to whether or not this information received is the field determination mode signal, and if the result is YES then the flow of control passes to the step S30 of FIG. 8. The receipt of the field determination mode signal means that during manufacture of the camera a workman has operated the above described mode switch provided within the body of the camera so as to set the field determination mode. At this stage of production the photometric sensor 25 has already been fixed within the viewfinder 2. Moreover, when the field determination mode is thus set, the workman should have already set a uniformly illuminated test field of comparatively high brightness before the photographic lens. This test field is for causing light from the photographic field to fall uniformly over the rectangular region 41 shown in FIG. 3.

Referring now to the FIG. 8 flow chart for field determination, in the step S30 the charge accumulation operation of the photometric sensor 25 is performed, and the light from the uniformly illuminated test field as received on its various sub-elements as shown in FIG. 3 is converted into electric charge, and the electric charge is accumulated by the charge accumulation section. Thus, only the sub-elements included in the K×L rectangular region 41 on which the light from the uniformly illuminated test field is currently falling will acquire a substantial electrical charge at this time, while the sub-elements outside this illuminated region 41 will not be very much charged up. Next, in the step S31, a photometric signal is read out from a current one of the sub-elements— i.e., the accumulated electric charges are read out one by one by the transmission section in time series according to the receipt of a predetermined clock signal, and, after the voltages thereof have been converted by the voltage conversion section, these signals are input to an A/D converter included in the CPU 101 and are successively converted into digital photometric signals. And next, in the decision step S32, a decision is made as to whether or not the value of the current photometric signal is greater than a predetermined value.

If the current sub-element in fact lies within the K×L rectangular region 41 shown in FIG. 3 on which the light from the brightly illuminated test field is presently falling, then its photometric signal will be higher than the predetermined value, so that the result of the decision in the step S32 will be YES, and the flow of control will skip to the step S34; while, if the current sub-element in fact does not lie within the region 41, then its photometric signal will be lower than the predetermined value, so that the result of the decision in the step S32 will be NO, and the flow of control will pass to the step S33. In this step S33, since the current sub-element lies outside the region 41 and accordingly is an invalid one (i.e.. is a sub-element whose photometric signal is not to be used for exposure value calculation), the address of this invalid sub-element is stored in the memory 104, and then the flow of control passes to the final decision step S34. In this decision step S34, a decision is made as to whether or not the above processing in the steps S31 through S33 has been performed for all of the M×N photometric signals from the photometric sensor 25 so that the addresses of all of the (M×N)–(K×L) invalid sub-elements thereof which lie outside the valid region 41 have been saved, and if the result of this decision is NO then the flow of control returns to the step S31 to check the value of the photometric signal from the next sub-element, while, when all of the M×N photometric signals from the photometric sensor 25 have been checked, then the flow of control returns to the initial step S15 of the FIG. 7 flow chart.

On the other hand, if in the step S16 of the FIG. 7 flow chart it is decided that the information received in the step S15 is not the field determination mode signal, i.e. is the film sensitivity value then in the step S17 the film sensitivity value is stored in the memory 104. Further, since the fact that the information received is the film sensitivity value implies that the camera is currently being used for normal photography, in the next step S18 the charge accumulation operation of the photometric sensor 25 is performed, and the light from the object to be photographed received on each of its sub-elements as shown in FIG. 3 is converted into electric charge and the electric charge is accumulated by the charge accumulation section. In the next step S19, a photometric signal is read out from a current one of the sub-elements, and next, in the decision step S20, a decision is made as to whether or not this current sub-element is an invalid one, i.e. as to whether or not it is a sub-element which lies outside the region 41 shown in FIG. 3, the locations of which were stored in the memory in the step S33 described above. If the current sub-element is an invalid one, then the flow of control simply returns to the step S19 to read out the photometric signal from the next sub-element, while, if the current sub-element is a valid one, then in the next step S21 the photometric signal (converted into a digital signal) is stored in the memory 104, and next, in the decision step S22, a decision is made as to whether or not the above processing in the steps S19 and S20 has been performed for all of the M×N photometric signals from the photometric sensor 25 so that all of the K×L valid ones thereof which emanate from the K×L rectangular valid region 41 have been saved, and if the result of this decision is NO then the steps S19 through S22 are repeated, while when all of the M×N photometric signals from the photometric sensor 25 have been processed as above then the flow of control passes to the step S23.

In this step S23, exposure value is calculated based upon the stored photometric signals and upon the above described film ISO sensitivity information which was input and was stored in the step S17, and an aperture value and a shutter speed are calculated based upon the exposure value. Next in the step S24 these calculated values are stored in the memory 104. And in the last step S25 these recorded exposure values are transferred to the CPU 74 in the camera body 1 via the contact 95. After this the flow of control returns to the step S15, and the above described process is repeated.

The process described above and shown in the flow charts of FIGS. 6 through 8 can be considered in summary as follows.

As a step in the manufacture of the camera, after the photometric sensor 25 has been fixed in a predetermined position in the viewfinder 2, a uniformly illuminated test field is positioned in front of the photographic lens, and the light from this test field falls upon the rectangular region 41 of the photometric sensor 25 as shown in FIG. 3. When in this condition the camera is set to the field determination mode, the charge accumulation action of the photometric sensor 25 is performed, and the photometric signals from all of the M×N sub-elements of the photometric sensor 25 are read in. Those of the sub-elements for which at this time the value of the photometric signal is higher than a predetermined value are deemed to be sub-elements which lie in the central rectangular region 41 on which the light from the photographic field can fall and which are valid for photometry, while those of the sub-elements for which at this time the value of the photometric signal is lower than the predetermined value are deemed to be surrounding sub-elements on which the light from the photographic field cannot fall and which are therefore not valid for photometry. The addresses of the latter sub-elements are therefore stored in the memory 104 as the addresses of invalid sub-elements.

The camera is shipped from the factory in this condition with the addresses of the invalid sub-elements of the photometric sensor 25 stored in the memory 104. When a photograph is to be taken, initially the first stroke switch is turned on as the release button is depressed, and in the same manner as described above the charge accumulation action of the photometric sensor 25 is performed and the photometric signals from all of the M×N sub-elements of the photometric sensor 25 are read in. At this time, based upon the information recorded in the memory 104, the valid photometric signals from the K×L valid sub-elements of the photometric sensor 25 which lie within the rectangular region 41 are discriminated from the invalid photometric signals from the invalid sub-elements which lie outside the rectangular region 41, and only the K×L values of the valid photometric signals are stored. Accordingly divided photometry is performed by dividing the photographic field into K×L regions, and thereafter an exposure value is calculated based upon the K×L valid stored photometric signal values and upon the ISO sensitivity value of the film.

According to the above described construction of this preferred embodiment, after the photometric sensor 25 has been fixed within the body of the camera, the ones of the plurality of sub-elements of which the photometric sensor 25 is composed which are invalid, i.e. upon which the light from the photographic field cannot fall, are determined and are recorded, and subsequently, based upon this recorded information, photometry is performed only using the photometric signals from the valid sub-elements. Therefore, it is only necessary to fix the photometric sensor 25 in a position such that the image of the photographic field definitely does not wander over its edge, i.e. in a position such that the entire image of the photographic field definitely falls upon the light receiving surfaces of a subset of the sub-elements of the photometric sensor 25, and then the same result as described above will be obtained, whichever in fact are the sub-elements included in said subset. Accordingly, even if the determination of the position of the photometric sensor 25 is performed relatively roughly, accurate photometric results can be obtained, and it is possible to determine an accurate exposure value.

In the above described preferred embodiment the sub-elements of the photometric sensor 25 which lay on the boundary of the rectangular region 41 were deemed to be valid sub-elements whose photometric signals could be used for purposes of exposure value calculation. In fact, however, the boundary of the actual region of the photometric sensor 25 upon which the light from the photographic field can fall inevitably does not accurately coincide with the divisions between the various sub-elements, and accordingly for some of these sub-elements on the boundary of the region 41 light from the photographic field only falls upon a part of their light receiving surfaces, and therefore the values of the photometric signals from these boundary sub-elements are relatively small, as compared to the photometric signals from sub-elements which lie within the interior of the region 41. Therefore if, in a variant embodiment of the present invention, the exposure value calculation is performed by appropriately weighting the photometric signals from these boundary sub-elements, a more accurate exposure value can be calculated. Further, if in such a variant embodiment the photometric signals from these boundary sub-elements are thus appropriately weighted, even if the photometric sensor is mounted to the body of the camera in a slanting orientation with respect to the image of the photographic field which falls upon the photometric sensor, an accurate exposure value can be calculated. As another possible variant embodiment, the sub-elements on the boundary of the region 41 could be considered as invalid ones.

Figure 9:
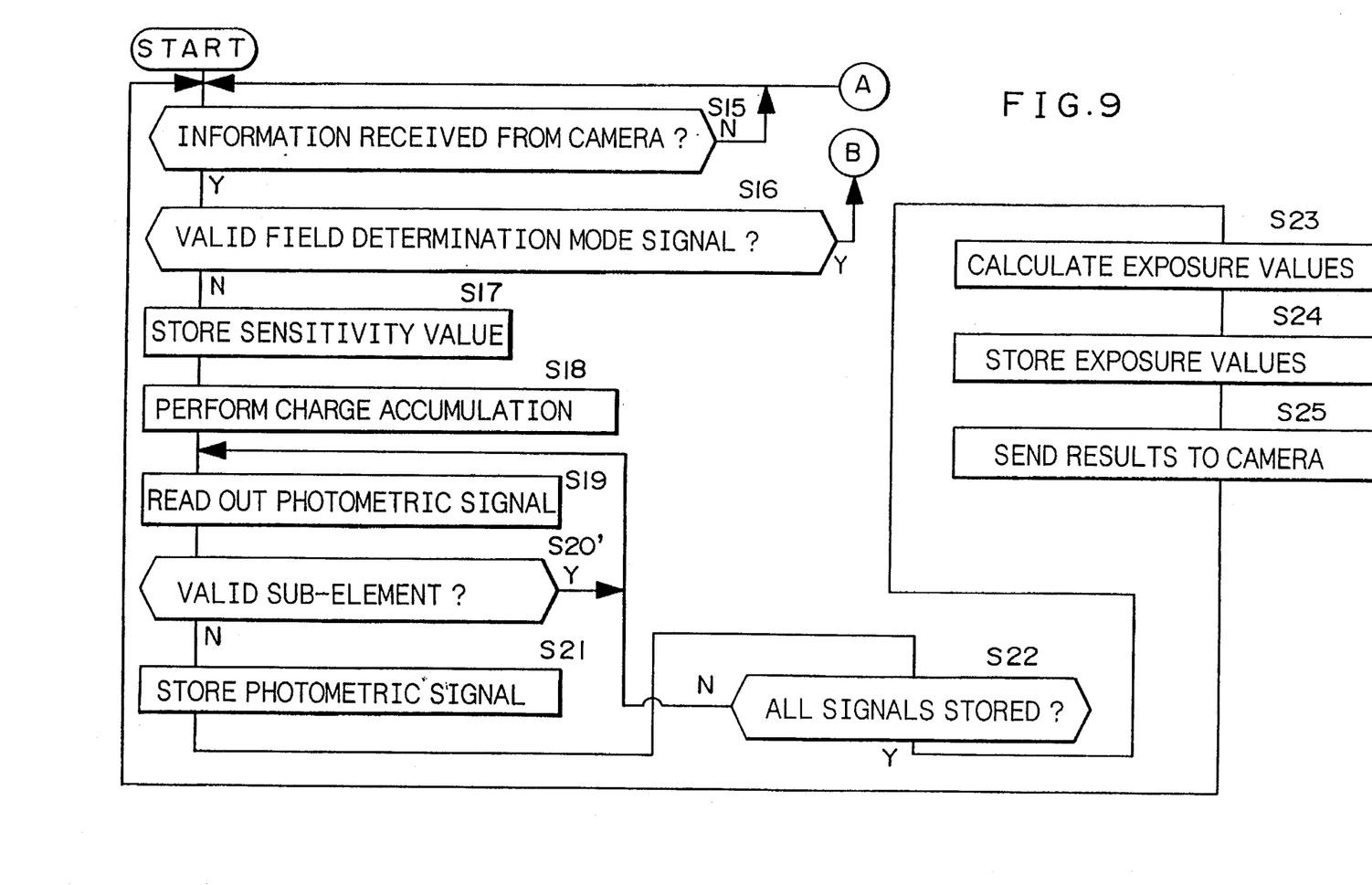
FIG. 9 is a flow chart for a variant embodiment, similar to FIG. 7, showing the operation of a control program for a CPU incorporated in the camera viewfinder.
Figure 10:
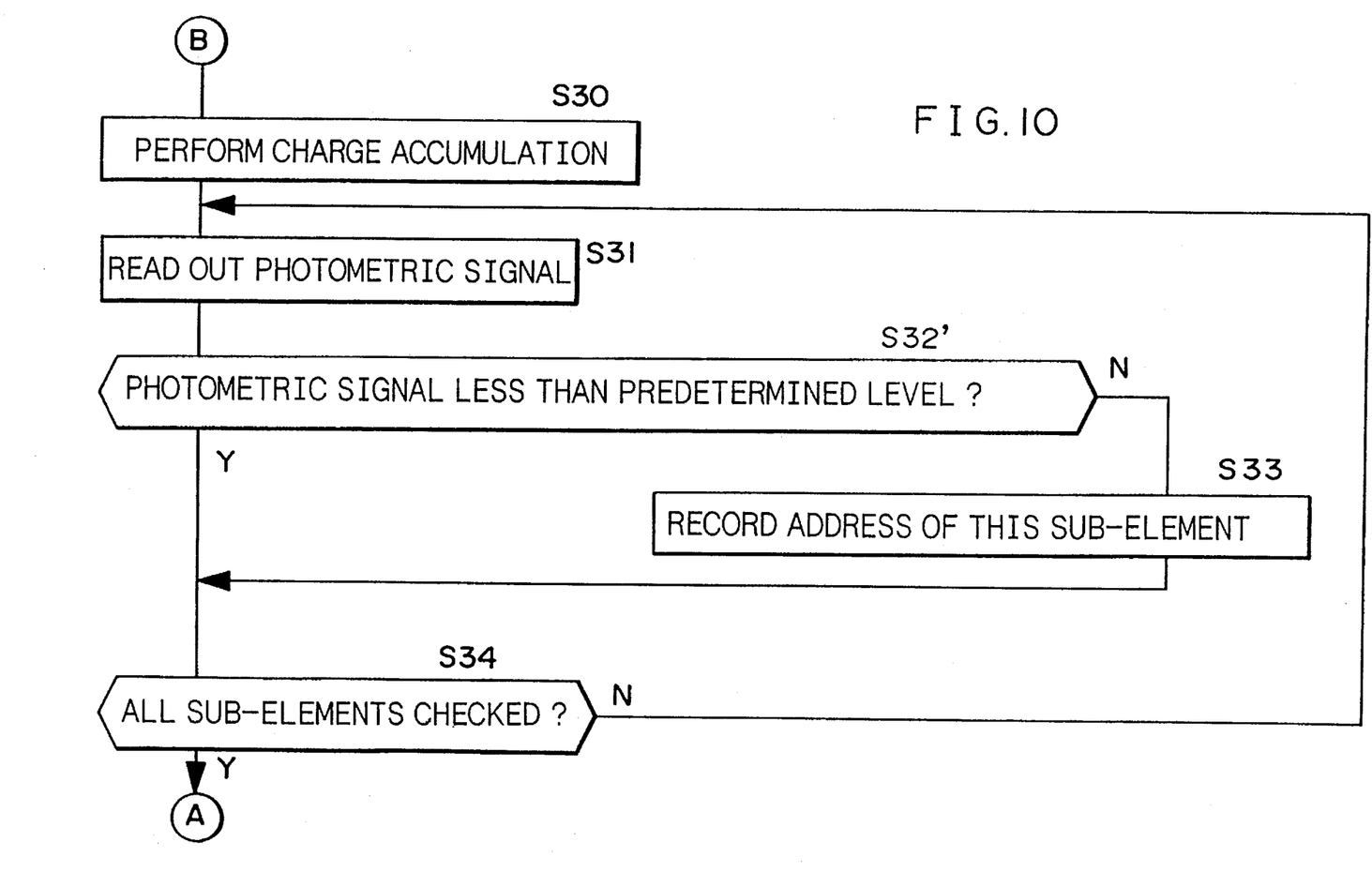
FIG. 10 is a continuation of the FIG. 7 flow chart for this variant embodiment.

Further, in the above described preferred embodiment, first in the field determination mode the addresses of the sub-elements which were deemed to be invalid were stored, and subsequently in the normal photographic mode the exposure value was calculated based upon the photometric output signals from the sub-elements (the valid ones) other than those whose addresses were thus stored. However, this is not limitative of the present invention; in another variant embodiment, in an opposite manner, it would be possible first in the field determination mode to store the addresses of those sub-elements which are deemed to be valid, and subsequently in the normal photographic mode to calculate the exposure value based upon the photometric output signals from the sub-elements whose addresses were thus stored. In order to realize this variant embodiment in practice, the flow charts of FIGS. 7 and 8 need to be modified to the flow charts of FIGS. 9 and 10 respectively. The only differences between these flow charts are that the step S20 of the FIG. 7 flow chart has been replaced by the step S20' of the FIG. 9 flow chart, and correspondingly the step S32 of the FIG. 8 flow chart has been replaced by the step S32' of the FIG. 10 flow chart. The operation of this variant embodiment will be easily understood based upon the above disclosure, and accordingly detailed description thereof herein is omitted.

Further, although in the above description it was stated that the process of determining and storing sub-element validity was performed as a step during the manufacture of the camera, as an alternative it would also be acceptable for this to be done after the camera has been completed and shipped. Moreover, although the above explanations were made in terms of a camera which had a viewfinder of the detachable type, the present invention could also be applied to a camera in which the viewfinder was provided integrally with the body of the camera. The manner of division of the photometric sensor is not to be considered as limited to that shown in FIG. 3, and also, provided that both the horizontal dimension and the vertical dimension of the total light receiving area of the photometric sensor are greater than the corresponding dimensions of the area thereof upon which the image of the photographic field falls, the ratio of these areas is not particularly restricted. Yet further, although the above explanation has been made in terms of a single lens reflex camera employing the so called TTL photometric method, as an alternative the present invention could also be applied to a lens shutter type camera employing an external type of photometry, in which photometry is performed upon light from an object to be photographed which has passed through an optical system which does not include the photographic lens. Therefore the position of the photometric sensor is not restricted to being within the viewfinder.

What is claimed is:

1. A camera capable of performing divisional photometry, comprising:

a photometric sensor having a plurality of photoelectric conversion sub-elements arranged in close proximity to one another over a predetermined light receiving region in a two dimensional array, and which performs photometry on the photographic field divided into a plurality of regions;

an image projection optical system that projects an image of a photographic field upon light receiving surfaces of a proper subset of said plurality of photoelectric conversion sub-elements which occupies a region which is smaller than said light receiving region;

a mode setting device that sets either of a photographic mode and a field determination mode according to the actuation of an operating member;

a determination device that, when said field determination mode is set, based upon the photometric outputs from said plurality of photoelectric conversion sub-elements, determines for each of said plurality of photoelectric conversion sub-elements whether it is a valid sub-element which is included in said proper subset of said plurality of photoelectric conversion sub-elements upon which said image of said photographic field falls, or an invalid sub-element which is not included in said proper subset of said plurality of photoelectric conversion sub-elements upon which said image of said photographic field falls;

a storage device that stores the results of said determinations performed by said determination device;

a selection device that, based upon the information stored by said storage device, selects said valid sub-elements from said plurality of photoelectric conversion sub-elements; and a calculation device that calculates an exposure value based upon the photometric outputs from said valid photoelectric conversion sub-elements selected by said selection device.

2. A camera capable of performing divisional photometry according to claim 1 wherein said determination device determines said photoelectric conversion sub-elements which output photometry outputs less than a predetermined standard value to be invalid, said storage device stores information indicative of which said photoelectric conversion photometric sub-elements have been thus determined to be invalid, and said selection device selects all said photoelectric conversion photometric sub-elements other than said photoelectric conversion sub-elements for which indicative information has thus been stored in said storage device.

3. A camera capable of performing divisional photometry according to claim 1, wherein said determination device determines said photoelectric conversion sub-elements which output photoelectric conversion outputs greater than a predetermined standard value to be valid, said storage device stores information indicative of which said photoelectric conversion sub-elements have been thus determined to be valid, and said selection device selects all said photoelectric conversion sub-elements for which indicative information has thus been stored in said storage device.

4. A camera capable of performing divisional photometry, comprising:

a photometric sensor having a plurality of photoelectric conversion sub-elements arranged in close proximity to one another over a predetermined light receiving region in a two dimensional array, and which performs divisional photometry on a photographic field;

an image projection optical system that projects an image of the photographic field upon light receiving surfaces of a proper subset of said plurality of photoelectric conversion sub-elements that occupies a region which is smaller than said light receiving region;

a determination device that, based upon photometric outputs from said plurality of photoelectric conversion sub-elements, determines whether each of said plurality of photoelectric conversion sub-elements is a valid sub-element which is included in said proper subset of said plurality of photoelectric conversion sub-elements upon which said image of said photographic field falls, or an invalid sub-element which is not included in said proper subset of said plurality of photoelectric conversion sub-elements upon which said image of said photographic field falls; and a calculation device that calculates an exposure value based upon the photometric outputs from said valid photoelectric conversion sub-elements.

5. A camera capable of performing divisional photometry according to claim 4, further comprising:

a storage device for storing results of said determinations performed by said determination device; and a selection device for selecting said valid photoelectric conversion sub-elements from said plurality of photoelectric conversion sub-elements based upon the information stored by said storage device, wherein said calculation device calculates an exposure value based upon the photometric outputs from said valid photoelectric conversion sub-elements selected by said selection device.

6. A camera capable of performing divisional photometry according to claim 5, wherein said determination means determines that said photoelectric conversion sub-elements which output a photoelectric conversion output less than a predetermined standard value are invalid sub-elements, wherein said storage device stores information indicative of which of said plurality of photoelectric conversion sub-elements have been determined to be invalid, and wherein said selection device selects all said photometric sub-elements other than said photoelectric conversion sub-elements for which invalid indicative information has been stored in said storage means.

7. A camera capable of performing divisional photometry according to claim 5, wherein said determination device determines that said photoelectric conversion sub-elements which output a photoelectric conversion output greater than a predetermined standard value are valid sub-elements, wherein said storage device stores information indicative of which of said plurality of photoelectric conversion sub-elements have been determined to be valid, and wherein said selection device selects all of said plurality of photoelectric conversion sub-elements for which valid indicative information has been stored in said storage device.

8. A camera capable of performing divisional photometry according to claim 5, wherein said photometric sensor is provided within a viewfinder of said camera, and said image projection optical system is comprised of an optical system of said viewfinder and a photographic lens of said camera.

9. A camera capable of performing divisional photometry according to claim 8, wherein said viewfinder is detachable from a main body of said camera, and said calculation device, said determination device, and said storage device are provided within said viewfinder.

10. A camera capable of performing divisional photometry according to claim 5, further comprising a mode setting device for setting a field determination mode based on the actuation of an operating member, and a control device for allowing the determination operation of said determination device and the storing of the results of the determination in said storage device when said field determination mode is set.

11. A camera capable of performing divisional photometry according to claim 10, wherein said operating member is provided at a position within a main body of said camera which is not accessible to a camera user.

12. A camera capable of performing divisional photometry according to claim 4, wherein said photometric sensor is an accumulation type sensor.

13. A camera capable of performing divisional photometry according to claim 4, wherein said photometric sensor comprises M×N photoelectric conversion sub-elements which are arranged in a rectangular array measuring M vertically by N horizontally.

14. A camera capable of performing divisional photometry according to claim 4, wherein said photometric sensor is provided within a viewfinder of said camera, and said image projection optical system is comprised of an optical system of said viewfinder and a photographic lens of said camera.

15. A camera capable of performing divisional photometry according to claim 14, wherein said viewfinder is detachable from a main body of said camera, and said calculation device is provided within said viewfinder.

16. A camera capable of performing divisional photometry, comprising:

a photometric sensor provided within a detachable viewfinder of said camera and having a plurality of photoelectric conversion sub-elements arranged in close proximity to one another over a predetermined light receiving region in a two dimensional array, and which performs divisional photometry on a photographic field;

an image projection optical system that projects an image of the photographic field upon light receiving surfaces of a proper subset of said plurality of photoelectric conversion sub-elements which occupies a region smaller than said light receiving region, said image projection optical system comprising an optical system of said detachable viewfinder and a photographic lens of said camera; and a calculation device that calculates an exposure value based upon the photometric outputs from said valid photoelectric conversion sub-elements, said calculation device being provided within said detachable viewfinder.

17. A camera capable of performing divisional photometry according to claim 16, wherein said photometric sensor is an accumulation type sensor.

18. A camera capable of performing divisional photometry according to claim 16, wherein said photometric sensor comprises M×N photoelectric conversion sub-elements which are arranged in a rectangular array measuring M vertically by N horizontally.

19. A photometric apparatus for performing photometry on a photographic field, comprising:

a photometric sensor having a plurality of photometric elements which include elements on which light from said photographic field falls and elements on which the light from said photographic field does not fall;

a determination device that determines photometric elements which receive light from said photographic field to be valid, and determines photometric elements which do not receive the light from said photographic field to be invalid; and a photometric calculation device that performs photometric calculation based upon outputs from said photoelectric conversion elements determined to be valid by said determination device.

* * * * *